United States Patent [19]
Iwamoto et al.

[11] Patent Number: 5,589,296
[45] Date of Patent: Dec. 31, 1996

[54] FIBROUS SOLID ELECTROLYTE, CELL USING THE ELECTROLYTE AND PROCESS FOR PRODUCING THE ELECTROLYTE

[75] Inventors: Kazuya Iwamoto, Sakai; Noboru Aotani, Uji; Kazunori Takada, Osaka; Shigeo Kondo, Hirakata, all of Japan

[73] Assignee: Matsushita Electric Industrial Co., Ltd., Osaka, Japan

[21] Appl. No.: 205,109

[22] Filed: Mar. 3, 1994

[30]     Foreign Application Priority Data

Mar. 22, 1993 [JP] Japan .................................. 5-061640

[51] Int. Cl.$^6$ ...................................................... H01M 6/18
[52] U.S. Cl. ...................... 429/191; 429/199; 429/206; 429/207; 429/188; 252/62.2; 252/500; 204/421
[58] Field of Search .................................. 429/191, 199, 429/206, 207, 188; 204/421; 252/500, 62.2

[56]                References Cited

U.S. PATENT DOCUMENTS

| | | | |
|---|---|---|---|
| 3,829,331 | 8/1974 | Tsang | 136/146 |
| 4,164,610 | 8/1979 | Beall et al. | 429/193 |
| 4,417,912 | 11/1983 | Abe | 65/33 |
| 4,731,311 | 3/1988 | Suzuki et al. | 429/213 |
| 4,810,599 | 3/1989 | Kondo et al. | 429/191 |
| 4,811,147 | 3/1989 | Kawai et al. | 360/120 |
| 5,130,039 | 7/1992 | Bloink et al. | 252/74 |
| 5,217,826 | 6/1993 | Yamamura et al. | 429/191 |

FOREIGN PATENT DOCUMENTS 450507  4/1968  Switzerland .

OTHER PUBLICATIONS

J. H. Kennedy, "Ionically Conductive Glasses Based on $SIS_2$", Materials Chemistry and Physics, 23 (1989), pp. 29–50 No month available.
Patent Abstracts of Japan, vol. 13, No. 408 (C–634) 8 Sep. 1989 & JP–A–01 148 812 (Mitsubishi Mining & Cement).
D. Chakravorty, et al, "Electrical Conduction in Glass Fibres Subjected to a Sodium–Silver Ion–Exchange Treatment", 1986, Journal of Physics D. Applied Physics, No. 19, pp. 2185–2195 no month available.
Database WPI, Derwent Publications Ltd., London, GB; AN 77–27803Y Matsushita 'Alkali Metal Titanate Glass Fibre' & JP–A–52 027 827 (Matsushita) Feb. 3, 1977.
Patent Abstracts of Japan vol. 15, No. 506 (E–1148) 20 Dec. 1991 & JP–A–03 222 206 (Matsushita Electric Ind Co).
Patent Abstracts of Japan, vol. 17, No. 17 (C–1016) 13 Jan. 1993 & JP–A–04 243 932 (Nitto Boseki Co Ltd).
Patent Abstracts of Japan, vol. 9, No. 293 (C–315) 20 Nov. 1985 & JP–A–60 134 026 (Nihon Muki Zairiyou).

*Primary Examiner*—Bruce F. Bell
*Attorney, Agent, or Firm*—Watson Cole Stevens Davis, P.L.L.C.

[57]             ABSTRACT

An ion conductive, fibrous solid electrolyte having a high ion conductivity, a distinguished mechanical strength and a good processability is provided by making an ion conductive solid electrolyte fibrous and glassy and shaping the resulting fibrous glassy solid electrolyte alone or together with thermoplastic resin fibers, and the shaped product is used in a cell as a solid electrolyte layer.

28 Claims, 2 Drawing Sheets

FIBROUS SOLID ELECTROLYTE, CELL USING THE ELECTROLYTE AND PROCESS FOR PRODUCING THE ELECTROLYTE

BACKGROUND OF THE INVENTION

1. Field of the Invention

The present invention relates to a fibrous solid electrolyte for use in solid electrochemical elements including a solid cell, a shaped product thereof and a process for forming the fibrous solid electrolyte, and more particularly to a fibrous lithium ion conductive solid electrolyte having the best ion conductivity, when its ion conductive species is lithium ions.

2. Related Art of the Invention

With recent development of portable appliances such as personal computers, portable telephones, etc., a demand for cells as their power source has been considerably increased. Particularly, lithium cells have been extensively studied in various fields as cells capable of giving a high energy density, because lithium is a substance having a small atomic weight and a large ionization energy.

On the other hand, the cells so far used in these fields are based substantially on a liquid electrolyte and thus it has been impossible to eliminate such problems as leakage of liquid electrolyte, etc. To solve these problems, thereby enhancing the reliability and also to make the elements smaller and thinner, attempts for replacing the liquid electrolyte with a solid electrolyte and making an entirely solid cell have been extensively made in various fields.

The above-mentioned lithium, when brought into an abnormal state, has a fear of ignition due to the high energy density. Thus, development of an entirely solid lithium cell using a solid electrolyte made from a non-combustible solid has been desired to ensure the safety of the cell. Lithium halide, lithium nitride, oxy acid salts of lithium, and their derivatives are known as solid electrolytes for use in such a cell. Furthermore, researches on sulfide glassy solid electrolytes such as $Li_2S-SiS_2$, $Li_2S-P_2S_5$, $Li_2S-S_2S_3$, etc. and lithium ion conductive solid electrolytes prepared by doping the above-mentioned glassy solid electrolytes with a lithium halide such as LiI, etc., or with an oxy acid salt of lithium such as $Li_3P_4$, etc., particularly on their physical properties have been made in the world owing to their high ion conductivity such as $10^{-4}$ to $10^{-3}$ S/cm.

However, these solid electrolytes are inorganic solid powders and thus pelletization by press molding, etc. are indispensable for their application to cells. The resulting pellets are too hard and fragile to make electrolytes having a smaller thickness and a larger area. Furthermore, the resulting electrode is fragile when assembled with the positive pole and the negative pole.

To solve this problem, it has been proposed to integrate the inorganic solid electrolyte powders with an elastic polymer, thereby increasing the processability of the solid electrolyte and produce a shaped solid electrolyte product having a desired shape such as a sheet form from the integrated powders.

According to one of the proposed processes for producing the shaped solid electrolyte product, the surfaces of solid electrolyte powders are coated by an elastic polymer dissolved in an organic solvent and then the resulting mixture of particles of the solid electrolyte powders are bonded to one particle to another by press molding, followed by removal of the organic solvent from the shaped product by evaporation. However, in case of a bulk electroconductivity-dominating solid electrolyte such as a glassy solid electrolyte, the ion conductivity will be lowered to the extreme, and thus it has been difficult to use this process.

SUMMARY OF THE INVENTION

An object of the present invention is to solve the above-mentioned problems and provide a fibrous solid electrolyte having a distinguished ion conductivity and a shaped product thereof and a process for producing the fibrous solid electrolyte.

According to the present invention, a fibrous ion conductive solid electrolyte can be produced as a fibrous glassy solid electrolyte from a molten glass or glass rod by a centrifugal method, a blowing method, a rod method or a pot method. Furthermore, the thus obtained fibrous solid electrolyte can be molded into a shaped solid electrolyte product in the form of a woven fabric or non-woven fabric. Furthermore, a thermoplastic structural member is filled in clearances in the fibrous glassy solid electrolyte or thermoplastic fibers are provided into the fibrous glassy solid electrolyte to prepare a woven fabric, and then a shaped solid electrolyte product is made therefrom.

The present fibrous ion conductive glassy solid electrolyte can take an ion conductive species selected from the group consisting of silver ions, copper ions, lithium ions and proton, and when the ion conductive species is lithium ions, the present fibrous ion conductive glassy solid electrolyte can have the best ion conductivity. Thus, the present invention will be described below, referring to a fibrous lithium ion conductive glassy solid electrolyte as a typical mode of the present invention.

In the present invention, the lithium ion conductive glassy solid electrolyte is either a sulfide-based one synthesized from a plurality of compounds including lithium sulfide at least or an oxide-based one synthesized from a plurality of compounds including lithium orthosilicate at least. A plurality of the compounds including lithium sulfide at least are preferably a combination of lithium sulfide and at least one member selected from the group consisting of silicon disulfide, diphosphorus pentasulfide and boron sulfide. A plurality of the compound including lithium sulfide at least can further contain at least one member selected from the group consisting of lithium phosphate and lithium sulfate. Still furthermore a plurality of the compounds including lithium sulfide at least can contain at least one of lithium halides.

A plurality of the compounds including lithium orthosilicate at least are a combination of lithium orthosilicate and at least one member selected from the group consisting of lithium phosphate, lithium zirconate and lithium borate.

In the present invention, the lithium ion conductive glassy solid electrolyte is synthesized from a combination of lithium sulfide, at least one member selected from the group consisting of silicon disulfide, diphosphorus pentasulfide and boron sulfide and at least one member selected from the group consisting of lithium phosphate, lithium sulfate, lithium orthosilicate and lithium oxide.

According to a first aspect of the present invention, a fibrous lithium ion conductive solid electrolyte comprises an ion conductive glassy solid electrolyte synthesized from 45 to 70% by mole of lithium sulfide and 55 to 30% by mole of silicon disulfide.

According to a second aspect of the present invention, a fibrous lithium ion conductive solid electrolyte comprises an ion conductive glassy solid electrolyte synthesized from a mixture consisting of 36 to 70% by mole of lithium sulfide, 24 to 55% by mole of silicon disulfide and 0.005 to 20% by mole of lithium phosphate, total being 100% by mole.

According to a third aspect of the present invention, a fibrous lithium ion conductive solid electrolyte comprises an ion conductive glassy solid electrolyte synthesized from a mixture consisting of 36 to 70% by mole of lithium sulfide, 24 to 55% by mole of silicon disulfide and 0.005 to 20% by mole of lithium oxide, total being 100% by mole.

According to a fourth aspect of the present invention, a fibrous lithium ion conductive solid electrolyte comprises an ion conductive glassy solid electrolyte synthesized from a mixture consisting of 27 to 70% by mole of lithium sulfide, 24 to 55% by mole of silicon disulfide and 0.005 to 20% by mole of lithium iodide, total being 100% by mole.

According to a fifth aspect of the present invention, a fibrous lithium ion conductive solid electrolyte comprises an ion conductive glassy solid electrolyte, synthesized from 80 to 40% by mole of lithium orthosilicate and 20 to 60% by mole of lithium phosphate, total being 100% by mole.

In the present invention, the solid electrolyte is made into a glassy fibrous form, and thus the solid electrolyte can be molded into a shaped solid electrolyte product with less grain boundaries and a high ion conductivity near to a bulk conductivity. Furthermore, glassy fibers of the solid electrolyte are entangled with one another, while maintaining a high ion conductivity near to the bulk conductivity, and thus the shaped solid electrolyte product can have sufficient mechanical strength and flexibility.

In the present invention, a thermoplastic structural member is filled into clearances in the fibrous glassy solid electrolyte, thereby much improving the mechanical strength of the shaped solid electrolyte product against bending and stretching. Furthermore, the thermoplastic structural member can be filled without any solvent, because the solid electrolyte is in a fibrous state. Thus, it is particularly preferable in the production of a shaped solid electrolyte product to fill the thermoplastic structural member into clearances in the fibrous glassy solid electrolyte.

As a solid electrolyte, a lithium ion conductive solid electrolyte, for example, $Li_2S-SiS_2$; a silver ion conductive solid electrolyte, for example, $AgI-Ag_2MoO_4$; a copper ion conductive solid electrolyte, for example, $CuI-Cu_2O-MoO_3$; and a proton conductive solid electrolyte, for example $BaO-P_2O_5$, can be enumerated, but a solid electrolyte for the fibrous glassy solid electrolyte is preferably such a solid electrolyte material that can be melted at a low temperature and produce a molten liquid having a low viscosity, and has a large difference between the glass transition temperature (Tg) and the crystallization temperature (Tc), i.e. (Tc-Tg) as an indicator of glass stability and a high ion conductivity at room temperature. To this effect, a lithium ion conductive, sulfide-based solid electrolyte having a melting temperature of 900° C. and a difference Tc-Tg of at least 100° C. synthesized from a combination of lithium sulfide and at least one member selected from the group consisting of silicon disulfide, diphosphorus pentasulfide and boron sulfide is preferable. When a lithium ion conductive, sulfide-based electrolyte is synthesized from the above-mentioned combination further containing at least one member selected from the group consisting of lithium phosphate, lithium sulfate and lithium orthosilicate or at least one of lithium halides, the electrolyte can have a particularly high ion conductivity. Thus, these latter combinations are particularly preferable.

PREFERRED EMBODIMENTS OF THE INVENTION

The present invention will be described in detail below, referring to Examples of the present invention, where all the operations were carried out in a dry box filled with an inert gas.

EXAMPLE 1

Figure 1:
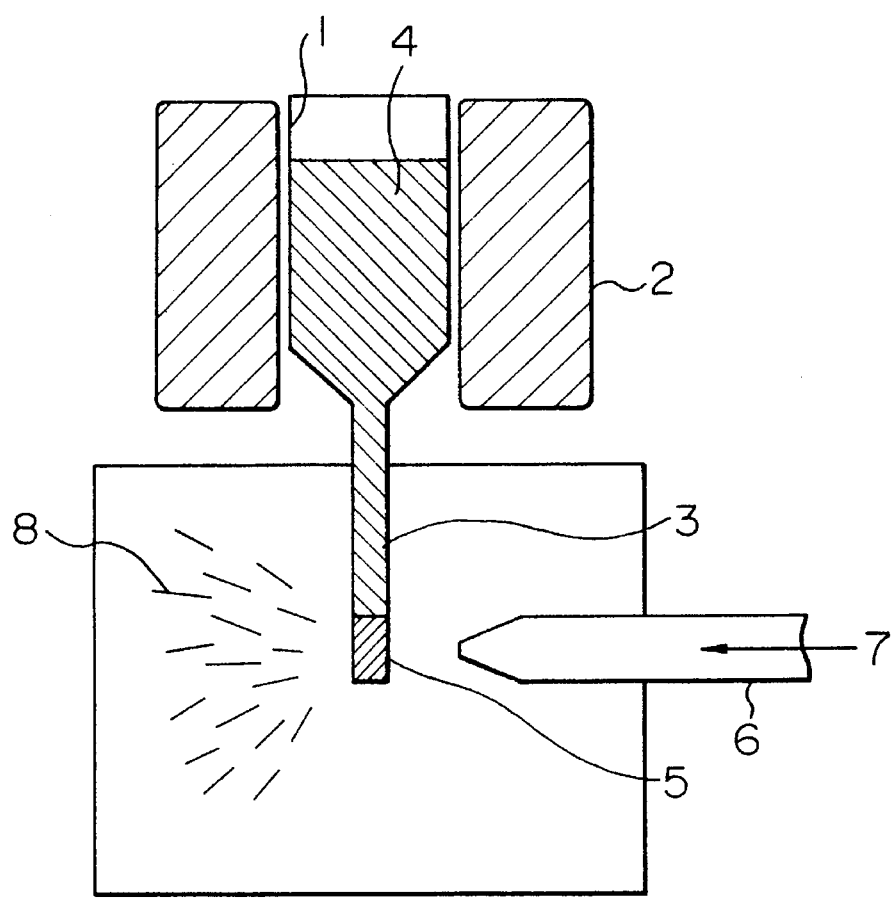
FIG. 1 is a schematic view showing the working principle of an apparatus for producing a fibrous solid electrolyte according to one embodiment of the present invention.

A fibrous glassy solid electrolyte was synthesized from a lithium ion conductive solid electrolyte represented by $0.5Li_2S-0.5SiS_2$ by a blowing method. Details of the synthesis will be explained below, referring to FIG. 1.

At first, a lithium ion conductive solid electrolyte represented by $0.5Li_2S-0.5SiS_2$ was prepared in the following manner.

That is, lithium sulfide ($Li_2S$) and silicon disulfide ($SiS_2$) was mixed together in a molar ratio of 0.5:0.5, and the resulting mixture was placed in a glassy carbon crucible 1. Then, the crucible 1 was placed in a vertical type, electric furnace 2 and heated in an argon gas stream up to 900° C. to melt the mixture. After the heating for 2 hours, a molten glass 4 as a liquid melt was made to flow downwards through a crucible nozzle 3 to its end and a molten glass drop 5 at the nozzle end was blown by a high pressure liquid nitrogen 7 from an injection nozzle 6 to form a lithium ion conductive fibrous glassy solid electrolyte 8 represented by $0.5Li_2S-0.5SiS_2$.

Then, the thus obtained fibrous glassy solid electrolyte was made into a non-woven fabric having a thickness of 150 μm by press molding. The ion conductivity of the shaped solid electrolyte product was determined by an AC impedance method, as will be described below.

At first, the thus obtained non-woven fabric sheet of shaped solid electrolyte product was cut into a disk having a diameter of 10 mm, Pt plates having a diameter of 10 mm each were provided in contact with both sides of the disk under pressure to serve as electrodes for impedance measurement, thereby making a cell for the ion conductivity determination.

AC impedance was measured by a vector impedance analyzer while applying a 10 mV AC to the electrodes. It was found that the shaped solid electrolyte product had an ion conductivity of $2.1 \times 10^{-4}$ S/cm.

Then, in order to investigate the flexibility of the shaped solid electrolyte product as a processability thereof, a bending test was carried out by winding the shaped solid electrolyte product around a stainless steel bar having a diameter of 50 mm and visually inspecting the state of wound product. It was found that the shaped solid electrolyte product had no abnormal appearance in the bending test, and thus had a good flexibility. After the bending test, the ion conductivity of the shaped product was again determined, and no change was found in the ion conductivity in the shaped product before and after the bending test.

As described above, a shaped solid electrolyte product having a good processability could be obtained without any considerable deterioration of the ion conductivity of solid electrolyte in this Example.

COMPARATIVE EXAMPLE 1

The molten glass (liquid melt) of Example 1 was put into liquid nitrogen to rapidly quench it in place of blowing the molten glass, thereby forming a bulky solid electrolyte for comparison. The resulting bulky solid electrolyte was ground to 100 mesh and under in a mortar and shaped into a disk having a diameter of 10 mm and a thickness of 0.2 mm by press molding under a pressure of 10 t/cm$^2$. The ion conductivity of the shaped product was determined in the same manner as in Example 1 and found to be $1.0 \times 10^{-4}$ S/cm, which was about a half of that of the shaped fibrous glassy solid electrolyte product. The shaped product is in a pellet state and thus was very brittle, and could not be subjected to a bending test.

EXAMPLE 2

A fibrous glassy solid electrolyte was prepared from a silver ion conductive solid electrolyte represented by $0.75AgI-0.25Ag_2MoO_4$ in place of the lithium ion conductive solid electrolyte represented by $0.5Li_2S-0.5SiS_2$ used in Example 1. Process for producing the silver ion conductive fibrous glassy solid electrolyte will be explained below:

Silver iodide (AgI) and silver molybdate ($Ag_2MoO_4$) were mixed in a molar ratio of 0.75:0.25, and the resulting mixture was placed in a glassy carbon crucible. Then, the crucible was placed in a vertical type furnace and heated in an argon gas stream up to 500° C. to melt the mixture. After the heating for 12 hours, a silver ion conductive fibrous glassy solid electrolyte represented by $0.75AgI-0.25Ag_2MoO_4$ was obtained by blowing drops of the molten glass with a high pressure liquid nitrogen.

A shaped fibrous glassy solid electrolyte product was formed from the thus obtained fibrous glassy solid electrolyte in the same manner as in Example 1.

The ion conductivity of the shaped solid electrolyte product was determined in the same manner as in Example 1 and found to be $2 \times 10^{-2}$ S/cm.

In a bending test carried out in the same manner as in Example 1, no abnormal appearance was observed. After the bending test, the ion conductivity was again determined, and it was found that no change was observed in the ion conductivity of the shaped product before and after the bending test and that the shaped product had a high flexibility.

As described above, a shaped solid electrolyte product having a good processability could be obtained without any considerable deterioration of the ion conductivity of solid electrolyte in this Example.

COMPARATIVE EXAMPLE 2

The molten glass (liquid melt) of Example 2 was put into liquid nitrogen to rapidly quench it in place of blowing the molten glass, thereby forming a bulky solid electrolyte for comparison. The resulting bulky solid electrolyte was ground to 100 mesh and under in a mortar and shaped into a disk having a diameter of 10 mm and a thickness of 0.2 mm by press molding under a pressure of 10 t/cm$^2$. The ion conductivity of the shaped product was determined in the same manner as in Example 1 and found to be $7.5 \times 10^{-3}$ S/cm, which was lower than that of the shaped fibrous glassy solid electrolyte product of Example 2. The shaped product was in a pellet state and thus was very brittle, and could not be subjected to a bending test, as in Comparative Example 1.

EXAMPLE 3

A fibrous glassy solid electrolyte was prepared from a copper ion conductive solid electrolyte represented by $0.3CuI-0.35Cu_2O-0.35MoO_3$ in place of the lithium ion conductive solid electrolyte represented by $0.5Li_2S-0.5SiS_2$ used in Example 1. Process for producing the copper ion conductive fibrous glassy solid electrolyte will be explained below:

Copper iodide (CuI), Cuprous oxide ($Cu_2O$) and molybdic acid ($MoO_3$) were mixed in a molar ratio of 0.3:0.35:0.35, and the resulting mixture was placed in a glassy carbon crucible. Then, the crucible was placed in a vertical type furnace and heated in an argon gas stream up to 700° C. to melt the mixture. After the heating for 3 hours, a cupper ion conductive fibrous glassy solid electrolyte represented by $0.3CuI-0.35Cu_2O-0.35MoO_3$ was obtained by blowing drops of the molten gas with a high pressure liquid nitrogen.

A shaped fibrous glassy solid electrolyte product was formed from the thus obtained fibrous glassy solid electrolyte in the same manner as in Example 1.

The ion conductivity of the shaped solid electrolyte product was determined in the same manner as in Example 1 and found to be $1.5 \times 10^{-3}$ S/cm.

In a bending test carried out in the same manner as in Example 1, no abnormal appearance was observed. After the bending test, the ion conductivity was again determined, and it was found that no change was observed in the ion conductivity of the shaped product before and after the bending test and that the shaped product had a high flexibility.

COMPARATIVE EXAMPLE 3

The molten glass (liquid melt) of Example 3 was put into liquid nitrogen to rapidly quench it in place of blowing the molten glass, thereby forming a bulky solid electrolyte for comparison. The resulting bulky solid electrolyte was ground to 100 mesh and under in a mortar and shaped into a disk having a diameter of 10 mm and a thickness of 0.2 mm by press molding under a pressure of 10 t/cm$^2$. The ion conductivity of the shaped product was determined in the same manner as in Example 1 and found to be $7.0 \times 10^{-4}$ S/cm, which was lower than that of the shaped fibrous glassy solid electrolyte product of Example 3. The shaped product was in a pellet state and thus was very brittle, and could not be subjected to a bending test.

EXAMPLE 4

A fibrous glassy solid electrolyte was prepared from a proton conductive solid electrolyte represented by $0.45BaO-0.55P_2O_5$ in place of the lithium ion conductive solid electrolyte represented by $0.5Li_2S-0.5SiS_2$ used in Example 1. Process for producing the proton conductive fibrous glassy solid electrolyte will be explained below:

Barium carbonate ($BaCO_3$) and orthophosphoric acid ($H_3PO_4$) were mixed in a molar ratio of 0.45:0.275, and the resulting mixture was placed in a glassy carbon crucible. Then, the crucible was placed in a vertical type furnace and heated in an argon gas stream up to 500° C. to melt the mixture. After the heating for 3 hours, a proton conductive fibrous glassy solid electrolyte represented by $0.45BaO$-$0.55P_2O_5$ was obtained by blowing drops of the molten gas by blowing with a high pressure liquid nitrogen.

A shaped fibrous glassy solid electrolyte product was formed from the thus obtained fibrous glassy solid electrolyte in the same manner as in Example 1.

The proton conductivity of the shaped solid electrolyte product at 150° C. was determined in the same manner as in Example 1 and found to be $6 \times 10^{-11}$ S/cm.

In a bending test carried out in the same manner as in Example 1, no abnormal appearance was observed. After the bending test, the proton conductivity was again determined, and it was found that no change was observed in the proton conductivity of the shaped product before and after the bending test and that the shaped product had a high flexibility.

COMPARATIVE EXAMPLE 4

The molten glass (liquid melt) of Example 4 was put into liquid nitrogen to rapidly quench it in place of blowing the molten glass, thereby forming a bulky solid electrolyte for comparison. The resulting bulky solid electrolyte was ground to 100 mesh and under in a mortar and shaped into a disk having a diameter of 10 mm and a thickness of 0.2 mm by press molding under a pressure of 10 t/cm². The proton conductivity of the shaped product at 150° C. was determined in the same manner as in Example 1 and found to be $8.0 \times 10^{-12}$ s/cm, which was lower than that of the shaped fibrous glassy solid electrolyte product. The shaped product was in a pellet state and thus was very brittle, and could not be subjected to a bending test.

EXAMPLE 5

A shaped solid electrolyte product was prepared in the same manner as in Example 1, except that a fibrous glassy solid electrolyte obtained by a centrifugal method, that is, by dropping the molten glass obtained in Example 1 onto a rotating scattering disk in place of the blowing method of Example 1 and scattering the drops of molten glass by a predetermined centrifugal force.

The ion conductivity of the shaped solid electrolyte product was determined in the same manner as in Example 1 and found to be $1.9 \times 10^{-4}$ S/cm.

In a bending test carried out in the same manner as in Example 1, no abnormal change was observed in the appearance, and thus it had a high flexibility.

EXAMPLE 6

A fibrous glassy solid electrolyte was prepared by a rod method, that is, shaping the molten glass of Example 1 into a rod and withdrawing the resulting solid electrolyte in place of the blowing method of Example 1. Its detail is given below:

At first, a lithium ion conductive glassy solid electrolyte represented by $0.03Li_3PO_4$-$0.59Li_2S$-$0.38SiS_2$ was synthesized as a solid electrolyte in the following manner.

That is, a glass matrix for synthesizing the glassy solid electrolyte was synthesized. A glassy solid electrolyte represented by $0.61Li_2S$-$0.3ASiS_2$ was obtained in the same manner as in Example 1 except that the molar ratio of lithium sulfide ($Li_2S$): Silicon sulfide ($SiS_2$) was changed to 0.61:0.39. The thus obtained glassy solid electrolyte was used as a glass matrix, and pulverized, and admixed with lithium phosphate so as to obtain a composition of $0.03Li_3PO_4$-$0.59Li_2S$-$0.38SiS_2$. Then, the mixture was again heated and melted in the same manner as in Example 1, and the resulting molten glass was poured into a stainless steel pipe, 5 mm in inner diameter, 50 mm in outer diameter and 15 cm in length, thoroughly cooled with liquid nitrogen to prepare a lithium ion conductive glassy solid electrolyte rod. Then, the glassy rod was heated to 350° C. and withdrawn, thereby making the lithium ion conductive glassy solid electrolyte represented by $0.03L_3PO_4$-$0.59Li_2S$-$0.38SiS_2$ into a long fiber. A fabric is woven from the thus obtained fibrous glassy solid electrolyte to obtain a shaped solid electrolyte product.

The ion conductivity of the shaped solid electrolyte product was determined in the same manner as in Example 1 and found to be $9.0 \times 10^{-5}$ S/cm.

In a bending test carried out in the same manner as in Example 1 no abnormal change was observed in the appearance of the shaped solid electrolyte product and it was found to have a high flexibility.

EXAMPLE 7

A shaped fibrous glassy solid electrolyte was obtained from a lithium ion conductive solid electrolyte represented by $0.03Li_2O$-$0.59Li_2S$-$0.38SiS_2$ in place of the lithium ion conductive solid electrolyte represented by $0.5Li_2S$-$0.5SiS_2$ used in Example 1. Process for producing a fibrous glassy lithium ion conductive solid electrolyte represented by $0.03Li_2O$-$0.59Li_2S$-$0.38SiS_2$ is given below:

At first, a glass matrix for synthesizing a glassy solid electrolyte was synthesized. That is, a glassy solid electrolyte represented by $0.61Li_2S$-$0.39SiS_2$ was obtained in the same manner as in Example 1 except that the molar ratio of lithium sulfide ($Li_2S$): silicon disulfide ($SiS_2$) was changed to 0.61:0.39. The resulting glassy solid electrolyte was used as a glass matrix and pulverized, and then admixed with lithium oxide so as to obtain a composition of $0.03Li_2O$-$0.59Li_2S$-$0.38SiS_2$. The mixture was again heated and melted in the same manner as in Example 1 and a shaped fibrous glassy solid electrolyte product was obtained in the same manner as in Example 1.

Ion conductivity of the shaped solid electrolyte product was determined in the same manner as in Example 1 and found to be $1.2 \times 10^{-4}$ S/cm.

In a bending test carried out in the same manner as in Example 1, no abnormal appearance was observed and then the ion conductivity was again determined. No change was observed in the ion conductivity between the shaped solid electrolyte product before and after the bending test. Thus, the shaped solid electrolyte product had a high flexibility.

As described above, a shaped solid electrolyte product having a good processability could be obtained without any considerable deterioration of the ion conductivity of solid electrolyte in the present invention.

EXAMPLE 8

A shaped solid electrolyte product was prepared from the fibrous glassy solid electrolyte represented by $0.5Li_2S$-

$0.5SiS_2$ of Example 1 and a thermoplastic structural member of polystyrene.

That is, the fibrous glassy solid electrolyte was mixed with 2% by weight of polystyrene powder on the basis of the fibrous glassy solid electrolyte and the resulting mixture was passed through a hot roller press at a temperature of 250° C. to form a shaped solid electrolyte product in a sheet form having a thickness of 150 μm. The ion conductivity of the product was determined in the same manner as in Example 1 and found to be $7.0\times10^{-5}$ S/cm.

In a bending test carried out in the same manner as in Example 1, no abnormal change was observed in the appearance, and it had a high flexibility.

EXAMPLE 9

A shaped solid electrolyte product was obtained in the same manner as in Example 7 except that 1,2-polybutadiene was used as a thermoplastic structural member in place of the polystyrene powder of Example 7.

That is, a fibrous glassy solid electrolyte of $0.5Li_2S$-$0.5SiS_2$ obtained in Example 1 was mixed with 3% by weight of 1,2-polybutadiene powder on the basis of the fibrous glassy solid electrolyte, and the resulting mixture was passed through a hot roller press at a temperature of 250° C. to form a shaped solid electrolyte product in a sheet form having a thickness of 150 μm. The ion conductivity of the shaped solid electrolyte product was determined in the same manner as in Example 1 and found to be $7.5\times10^{-5}$ S/cm.

In a bending test carried out in the same manner as in Example 1, no abnormal change was observed in the appearance, and it had a high flexibility.

EXAMPLE 10

$0.5Li_2O$-$0.5SiS_2$ used as a lithium ion conductive solid electrolyte in Example 1 was made into long fibers by a pot method, that is, by melting the solid electrolyte and making the melt to flow out of nozzles at the bottom of a crucible, followed by rapid quenching, and winding the resulting filaments around a drum. A fabric was woven from the resulting long fibrous glassy solid electrolyte to obtain a shaped solid electrolyte product.

The ion conductivity of the shaped solid electrolyte product was determined in the same manner as in Example 1 and found to be $8.0\times10^{-5}$ S/cm.

In a bending test carried out in the same manner as in Example 1, no abnormal change was observed in the appearance, and it had a high flexibility.

EXAMPLE 11

Figure 2:
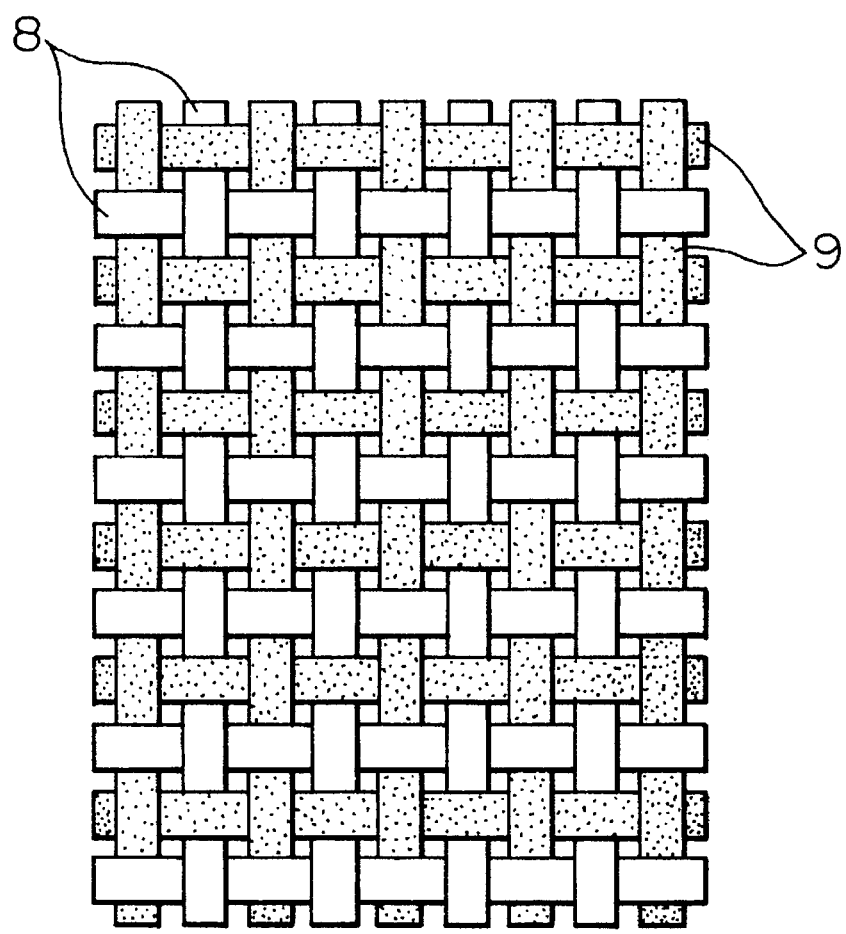
FIG. 2 is a schematic view of a woven fabric of a fibrous solid electrolyte and a fibrous thermoplastic resin according to another embodiment of the present invention.

Long fibrous glassy solid electrolyte 8 obtained in Example 10 and polyethylene fibers 9 were alternately provided and woven into a fabric, as shown in FIG. 2, to obtain a shaped solid electrolyte product.

The ion conductivity of the shaped solid electrolyte product was determined in the same manner as in Example 1 and found to be $7.2\times10^{-5}$ S/cm.

In a bending test carried out in the same manner as in Example 1, no abnormal change was observed in the appearance, and it had a high flexibility.

EXAMPLE 12

The shaped solid electrolyte product obtained in Example 10 was heated to 250° C. in an inert atmosphere to improve the bonding between the solid electrolyte fibers. It was found that the ion conductivity and flexibility of the resulting shaped solid electrolyte product were the same as in Example 11.

That is, a shaped solid electrolyte product having a good processability could be obtained without any considerable deterioration of the ion conductivity of the solid electrolyte in this Example.

EXAMPLE 14

A solid electrolyte represented by $0.3LiI$-$0.35Li_2S$-$0.35SiS_2$ was made into glassy fibers by the same blowing method as in Example 1, and a shaped solid electrolyte product was made from the resulting glassy fibers and polystyrene as a plastic structural member. Detail of the process will be given below:

At first, a lithium ion conductive glassy solid electrolyte represented by $0.3LiI$-$0.35Li_2S$-$0.35SiS_2$ was synthesized in the following manner.

A glassy solid electrolyte represented by $0.5Li_2S$-$0.5SiS_2$, obtained in Example 1, was used as a glass matrix and pulverized, and then mixed with lithium iodide so as to obtain a composition of $0.3LiI$-$0.35Li_2S$-$0.35SiS_2$. The mixture was heated and melted, and drops of the resulting molten glass were blown by high pressure liquid nitrogen in the same manner as in Example 1 to obtain a lithium ion conductive fibrous glassy solid electrolyte represented by $0.3LiI$-$0.35Li_2S$-$0.35SiS_2$.

The resulting solid electrolyte was made in a shaped solid electrolyte product in the same manner as in Example 8, except that 3.0% by weight of polystyrene was used as a thermoplastic structural member on the basis of the solid electrolyte in place of 2% by weight of Example 8.

The ion conductivity of the shaped solid electrolyte product was determined in the same manner as in Example 1 and found to be $5.5\times10^{-4}$ S/cm, and that of the fibrous glassy solid electrolyte alone was also determined in the same manner as in Example 1 and found to be $8\times10^{-4}$ S/cm. In a bending test carried out in the same manner as in Example 1, no abnormal change was observed in the appearance, and it had a high flexibility.

EXAMPLE 15

A lithium ion conductive fibrous glassy solid electrolyte represented by $0.5Li_2S$-$0.5P_2S_5$ was made into glassy fibers by the same blowing method as in Example 1, and a shaped solid electrolyte product was made from the resulting glassy fibers and polystyrene as a plastic structural member. Detail of the process will be given below:

At first, a lithium ion conductive glassy solid electrolyte represented by $0.5Li_2S$-$0.5P_2S_5$ in a molar ratio was synthesized from lithium sulfide ($Li_2S$) and diphosphorus pentasulfide ($P_2S_5$) as the starting materials for the solid electrolyte.

The resulting solid electrolyte was made in a shaped solid electrolyte product in the same manner as in Example 8, except that 3.0% by weight of polystyrene was used as a thermoplastic structural member on the basis of the solid electrolyte in place of 2% by weight of Example 8.

The ion conductivities of the shaped solid electrolyte product and the fibrous glassy solid electrolyte were determined in the same manner as in Example 1 and it was found that the ion conductivity of the shaped solid electrolyte product was $1.8 \times 10^{-4}$ S/cm and that of the fibrous glassy solid electrolyte containing no thermoplastic structural member was $3.2 \times 10^{-4}$ S/cm. In a bending test carried out in the same manner as in Example 1, no abnormal change was observed in the appearance, and it had a high flexibility.

EXAMPLE 16

A shaped solid electrolyte product was made from a lithium ion conductive fibrous glassy solid electrolyte represented by $0.6Li_2S$-$0.4B_2S_3$ as a solid electrolyte and polystyrene as a thermoplastic structural member. Detail of the process will be given below.

A glassy solid electrolyte represented by $0.6Li_2S$-$0.4B_2S_3$ was synthesized in the same manner as in Example 1, except that a mixture of lithium sulfide ($Li_2S$) and boron sulfide ($B_2S_3$) in a molar ratio of 0.6:0.4 as starting materials for the solid electrolyte was used.

Then, a shaped solid electrolyte product was prepared in the same manner as in Example 8, except that 0.3% by weight of polystyrene as a thermoplastic structural member is added to the resulting solid electrolyte on the basis of the solid electrolyte.

The ion conductivities of the shaped solid electrolyte product and fibrous glassy solid electrolyte were determined in the same manner as in Example 1, and it was found that the ion conductivity of the shaped solid electrolyte product was $1.5 \times 10^{-4}$ S/cm and that of the fibrous glassy solid electrolyte containing no thermoplastic structural member was $2.8 \times 10^{-4}$ S/cm. In a bending test carried out in the same manner as in Example 1, no abnormal change was observed in the appearance, and it had a high flexibility.

Thus, a shaped solid electrolyte product having a good processability could be obtained without any considerable deterioration of the ion conductivity of the solid electrolyte.

EXAMPLE 17

A shaped fibrous glassy solid electrolyte product was made from $0.4Li_3PO_4$-$0.6Li_4SiO_4$ as a lithium ion conductive solid electrolyte by a blowing method. Detail of the process will be given below:

At first, a lithium ion conductive fibrous glassy solid electrolyte was synthesized from $0.4Li_3PO_4$-$0.6Li_4SiO_4$ as a solid electrolyte in the following manner:

That is, lithium phosphate ($Li_3PO_4$) and lithium silicate ($Li_4SiO_4$) were mixed together in a molar ratio of 0.4:0.6, and then the resulting mixture was placed in a glassy carbon crucible. Then, the crucible was placed in a vertical type, electric furnace and heated in an argon gas stream up to 1,300° C. to melt the mixture. After the heating for 2 hours, a molten glass was made to flow downwards through a crucible nozzle to its end and a molten glass drop at the nozzle end was blown by a high pressure liquid nitrogen to form a lithium ion conductive fibrous glassy solid electrolyte represented by $0.4Li_3PO_4$-$0.6Li_4SiO_4$.

Then the thus obtained fibrous glassy solid electrolyte was made into a non-woven fabric by press-shaping. The ion conductivity of the shaped solid electrolyte product in the form of a fabric was determined in the same manner as in Example 1 and found to be $2.8 \times 10^{-6}$ S/cm.

Then, the processability of the shaped solid electrolyte product was investigated by the same bending test as in Example 1. It was found that the shaped solid electrolyte product had no abnormal appearance in the bending test, and thus had a good flexibility.

EXAMPLE 18

A lithium cell was prepared with the shaped fibrous glassy solid electrolyte product obtained in Example 13. Detail of the process will be given below, referring to FIG. 3.

Figure 3:
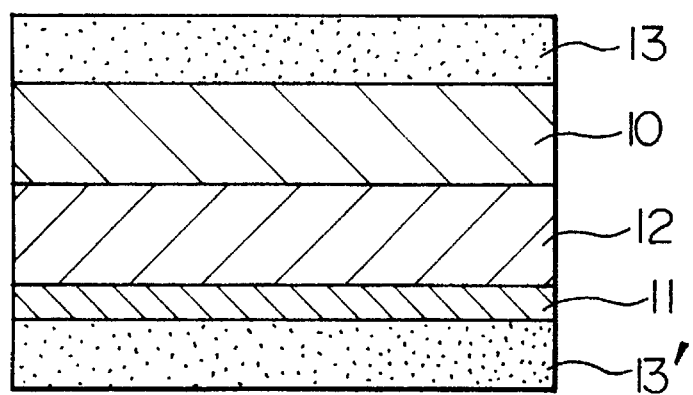
FIG. 3 is a structural view of a lithium cell using a shaped fibrous solid electrolyte according to other embodiment of the present invention.

Titanium disulfide ($TiS_2$) and the shaped fibrous glass solid electrolyte product obtained in Example 13 were mixed together in a weight ratio of 1:1 and molded by pressing into a positive pole 10, 0.1 mm thick and 10 mm×13 mm square. A Li sheet, 0.1 mm thick and 10 mm×30 mm square, was used as a negative pole 11. The shaped fibrous glassy solid electrolyte product obtained in Example 13 was shaped into a sheet, 0.2 mm thick and 10 mm×30 mm square and used as an electrolyte 12. The electrolyte 12 was sandwiched between the positive pole and the negative pole and then carbon pastes 13 and 13' were provided at the outsides of the positive pole 10 and the negative pole 11, respectively, to serve as terminals. Thus, an entirely solid lithium secondary cell was obtained, as shown in FIG. 3.

Figure 4:
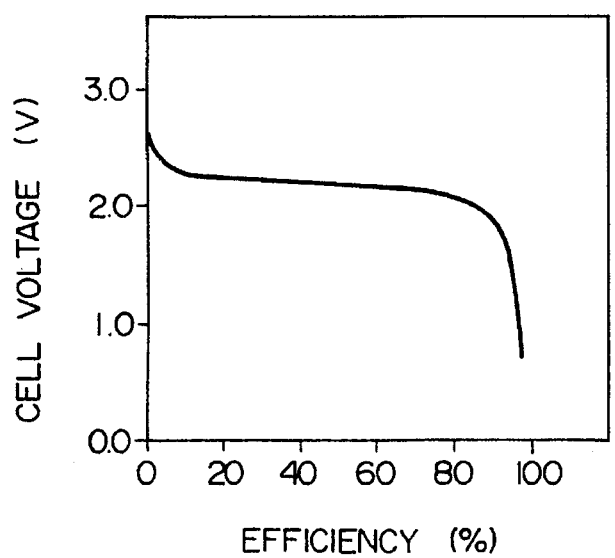
FIG. 4 is a diagram showing a discharge curve of a lithium cell using a shaped fibrous electrolyte according to further embodiment of the present invention.

An open circuit voltage of the entirely solid lithium secondary cell was 2.8 V, and a short circuit current was 700μA/cm$^2$. When the cell was discharged at a current density of 100 μA/cm$^2$, a discharge curve as shown in FIG. 4 was obtained.

Then, the cell was bent to an angle of 30° C. along a stainless steel rod, 50 mm in diameter, 5 times, and it was found that the bending gave no influence on the initial characteristics of the charging and discharging of the cell.

Still furthermore, a charge-discharge cycle test of the cell was conducted at a discharge end voltage of 1.9 V and a current density of 100 μA/cm$^2$, both selected in view of a relatively stable voltage range, and it was found that the charge-discharge curve was not changed at all even after 300 cycles and no change was observed in the short circuit current. Thus, the cell worked stably.

In the foregoing Examples description of the process for preparing a fibrous glassy solid electrolyte has been made only on the blowing method, the centrifugal method, and the pot method and the rod method, but other methods, for example, a pick-up method can be effectively employed. Thus, the process for preparing a fibrous glassy solid electrolyte is not limited only to the above-mentioned four methods in the present invention.

Furthermore, description of thermoplastic structural member has been made only on polystyrene, 1,2-polybutadiene and polyethylene, but other resins such as styrene-ethylene-butadiene block copolymer, etc. can be also effectively employed as the thermoplastic structural member, and thus the thermoplastic structural member is not limited only to the above-mentioned three resins.

Still furthermore, in the foregoing Examples, description of lithium ion conductive sulfide-based solid electrolyte has been made on $0.5Li_2S$-$0.5SiS_2$, $0.03Li_3PO_4$-$0.5$-$Li_2S$-$0.38SiS_2$, $0.5Li_2S$-$0.5P_2S_5$, and $0.6Li_2S$-$0.4B_2S_3$; that of lithium ion conductive oxide-based solid electrolyte on $0.4Li_3PO_4$-$0.6Li_4SiO_4$; that of silver ion conductive solid electrolyte on $0.75AgI$-$0.25Ag_2MoO_4$; that of copper ion conductive solid electrolyte on $0.3CuI$-$0.35Cu_2O$-$0.35MoO_3$; and that of proton conductive solid electrolyte on $0.45BaO$-$0.55P_2O_2$, but other solid electrolyte capable of forming a glassy solid electrolyte can be also employed, and the present invention is not limited to the above-mentioned ones.

In Example 18, a mixture of titanium disulfide as an active substance and fibrous glassy solid electrolyte of $0.03Li_3PO_4$-$0.59Li_2S$-$0.38SiS_2$ was used as a positive pole of the entirely solid lithium secondary cell, but the above-mentioned solid electrolytes and other active substances for the positive pole such as chalcogen intercalation compounds such as tantalum disulfide or transition metal oxides in place of the titanium disulfide can be also effectively employed. That is, the present lithium cell is not limited only to the above-mentioned mixture of the active substance for the positive pole and the fibrous glassy solid electrolyte.

Furthermore, in Example 18 description of shaped fibrous glassy solid electrolyte product layer in the entirely solid lithium cell has been made on the shaped product of lithium ion conductive glassy solid electrolyte represented by $0.03Li_3PO_4$-$0.59Li_2S$-$0.38SiS_2$, but any other lithium ion conductive solid electrolyte capable of forming a glassy solid electrolyte can be also employed.

Still furthermore, in Example 18 a Li sheet was employed as a negative pole material in the entirely solid lithium cell, but any other lithium alloy can be also effectively employed, and thus the present invention is not limited only to the Li sheet.

In the present invention, a shaped solid electrolyte product having a high conductivity near to the bulk conductivity can be obtained by making the glassy solid electrolyte fibrous and shaping the resulting fibrous glassy solid electrolyte.

Particularly in case of lithium ion conductive solid electrolyte having a good glass stability a shaped solid electrolyte product having a high ion conductivity can be readily obtained by making a lithium ion conductive solid electrolyte synthesized from a plurality of sulfide-based compounds including lithium sulfide at least into a glassy, fibrous state, as compared with oxide-based lithium ion conductive solid electrolyte.

Furthermore, a shaped solid electrolyte product having a high ion conductivity and a good processability can be obtained by filling a thermoplastic structural member into clearances in the shaped fibrous glassy solid electrolyte product.

A lithium cell or a solid electrochemical sensor having a good flexibility and a low internal resistance can be obtained from the above-mentioned fibrous glassy solid electrolyte product.

What is claimed is:

1. A fibrous solid electrolyte for use in solid electrochemical elements, which comprises a fibrous ion conductive glassy solid electrolyte, whose ion conductive species is selected from the group consisting of copper and proton.

2. A fibrous solid electrolyte according to claim 1, wherein said solid electrolyte comprises a fibrous lithium ion conductive glassy solid electrolyte in the form of woven fabric or non-woven fabric.

3. A fibrous solid electrolyte according to claim 1, wherein the electrolyte comprises discrete fibers of the fibrous ion conductive glassy electrolyte.

4. A fibrous solid electrolyte according to claim 1, wherein the ion conductive species is copper.

5. A fibrous solid electrolyte according to claim 1, wherein the fibrous ion conductive glassy solid electrolyte is amorphous.

6. A fibrous lithium ion conductive solid electrolyte, which comprises an ion conductive glassy solid electrolyte synthesized from a plurality of compounds including at least lithium sulfide and which is melted when heated to a temperature between 500° C. and 900° C. and which has a difference of at least 100° C. between its crystallization temperature Tc and its glass transition temperature Tg.

7. A fibrous solid electrolyte according to claim 6, wherein the compounds other than the lithium sulfide is at least one member selected from the group consisting of silicon disulfide, diphosphorus pentasulfide and boron sulfide.

8. A fibrous lithium ion conductive solid electrolyte according to claim 6, wherein said solid electrolyte comprises a fibrous ion conductive glassy solid electrolyte in the form of woven fabric or non-woven fabric.

9. A fibrous lithium ion conductive solid electrolyte according to claim 6, wherein the ion conductive glassy solid electrolyte is in a fibrous form, and thermoplastic resin particles are provided in clearances between the fibers.

10. A fibrous lithium ion conductive solid electrolyte according to claim 6, wherein the ion conductive glassy solid electrolyte is in a fibrous form, combined with thermoplastic resin fibers.

11. A fibrous lithium ion conductive solid electrolyte which comprises an ion conductive glassy solid electrolyte synthesized from 45 to 70% by mole of lithium sulfide and 55 to 30% by mole of silicon disulfide.

12. A fibrous lithium ion solid electrolyte according to claim 11, wherein said solid electrolyte has a melting temperature of 500° C. to 900° C. and a difference of at least 100° C. between its crystallization temperature Tc and its glass transition temperature Tg.

13. A fibrous lithium ion conductive solid electrolyte, which comprises an ion conductive glassy solid electrolyte synthesized from lithium sulfide, at least one member selected from the group consisting of silicon disulfide, diphosphorus pentasulfide and boron sulfide, and at least one member selected from the group consisting of lithium phosphate, lithium sulfate, lithium orthosilicate and lithium oxide.

14. A fibrous lithium ion conductive solid electrolyte, which comprises an ion conductive glassy solid electrolyte synthesized from a mixture consisting of 36 to 70% by mole of lithium sulfide, 24 to 55% by mole of silicon disulfide and 0.005 to 20% by mole of lithium phosphate, total being 100% by mole.

15. A fibrous lithium ion conductive solid electrolyte according to claim 14, wherein said solid electrolyte comprises a fibrous ion conductive glassy solid electrolyte in the form of woven fabric or non-woven fabric.

16. A fibrous lithium ion conductive solid electrolyte, which comprises an ion conductive glassy solid electrolyte synthesized from a mixture consisting of 36 to 70% by mole of lithium sulfide, 24 to 55% by mole of silicon disulfide and 0.005 to 20% by mole of lithium oxide, total being 100% by mole.

17. A fibrous lithium ion conductive solid electrolyte according to claim 16, wherein said solid electrolyte comprises a fibrous ion conductive glassy solid electrolyte in the form of woven fabric or non-woven fabric.

18. A fibrous lithium ion conductive solid electrolyte according to claim 16, wherein the ion conductive glassy solid electrolyte is in a fibrous form, combined with thermoplastic resin fibers.

19. A fibrous lithium ion conductive solid electrolyte according to claim 16, wherein the ion conductive glassy solid electrolyte is in a fibrous form, and thermoplastic resin particles are provided in clearances between the fibers.

20. A fibrous lithium ion conductive solid electrolyte, which comprises an ion conductive glassy solid electrolyte synthesized from lithium sulfide, at least one member selected from the group consisting of silicon disulfide, diphosphorus pentasulfide and boron sulfide, and at least one lithium halogenide selected from the group consisting of lithium iodide, lithium bromide and lithium chloride.

21. A fibrous lithium ion conductive solid electrolyte, which comprises an ion conductive glassy solid electrolyte synthesized from a mixture consisting of 27 to 70% by mole of lithium sulfide, 24 to 55% by mole of silicon disulfide and 0.005 to 20% by mole of lithium iodide, total being 100% by mole.

22. A fibrous lithium ion conductive solid electrolyte, which comprises an ion conductive glassy solid electrolyte synthesized from lithium orthosilicate, and at least one member selected from the group consisting of lithium phosphate, lithium zirconate and lithium borate.

23. A fibrous lithium ion conductive solid electrolyte according to claim 22, wherein the ion conductive glassy solid electrolyte is in a fibrous form, combined with thermoplastic resin fibers.

24. A fibrous lithium ion conductive solid electrolyte according to claim 22, wherein the ion conductive glassy solid electrolyte is in a fibrous form, and thermoplastic resin particles are provided in clearances between the fibers.

25. A fibrous lithium ion conductive solid electrolyte according to claim 22, wherein said solid electrolyte comprises a fibrous ion conductive glassy solid electrolyte in the form of woven fabric or non-woven fabric.

26. A fibrous lithium ion conductive solid electrolyte, which comprises an ion conductive glassy solid electrolyte, synthesized from 80 to 40% by mole of lithium orthosilicate and 20 to 60% by mole of lithium phosphate, total being 100% by mole.

27. A process for producing a fibrous ion conductive glassy solid electrolyte, which comprises making an ion conductive glassy solid electrolyte into a molten glass or glass rod form and making the molten glass or the glass rod into a fibrous form by a centrifugal method, a blowing method, a pot method or a rod method.

28. A cell, which comprises a positive pole, a negative pole and a fibrous lithium ion conductive glassy solid electrolyte layer, provided between the positive pole and the negative pole.

* * * * *